T. D. BREEN.
JASS STAGE.
APPLICATION FILED AUG. 18, 1917.

1,259,352.

Patented Mar. 12, 1918.
2 SHEETS—SHEET 1.

WITNESSES

INVENTOR
T. D. Breen
BY
ATTORNEYS

T. D. BREEN.
JASS STAGE.
APPLICATION FILED AUG. 18, 1917.
1,259,352.
Patented Mar. 12, 1918.
2 SHEETS—SHEET 2.
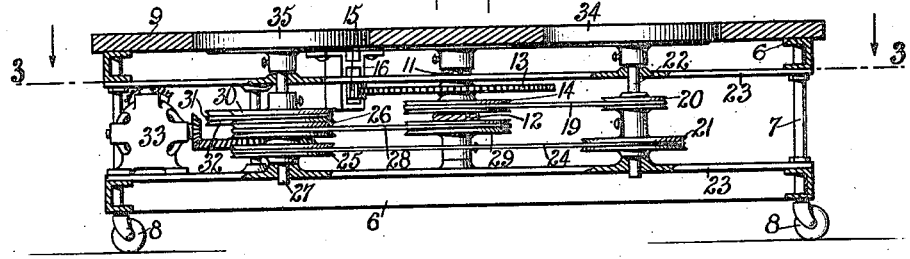
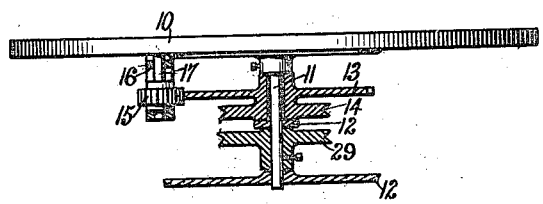
WITNESSES
INVENTOR
T. D. Breen
BY
ATTORNEYS

UNITED STATES PATENT OFFICE.

THOMAS D. BREEN, OF NEW YORK, N. Y.

JASS-STAGE.

1,259,352.

Specification of Letters Patent.

Patented Mar. 12, 1918.

Application filed August 18, 1917. Serial No. 186,956.

*To all whom it may concern:*

Be it known that I, THOMAS D. BREEN, a citizen of the United States, and a resident of the city of New York, Richmond Hill, borough of Queens, in the county of Queens and State of New York, have invented a new and Improved Jass-Stage, of which the following is a full, clear, and exact description.

The invention relates to a stage to be used for illusions, dancing, balancing, juggling, acrobatic and musical comedy tricks. The stage is formed of a series of sections each provided with a plurality of movable disks. A complete unit or stage consists of twelve sections, but the number of the sections may be varied according to the size of the stage. Each of the sections has four movable disks all actuated from the same driving unit, which may be located within the section or exterior of same.

I attain the above and other objects of my invention by the structure conventionally disclosed in the accompanying drawings, wherein similar characters of reference indicate corresponding parts in all the views.

Fig. 2 is a cross section through one of the sections of the stage on line 2—2, Fig. 3;

Fig. 3 is a horizontal section on line 3—3, Fig. 2, certain parts being broken away to show the details of construction; and Fig. 4 is a section through the axis of the main disk.

Figure 1:
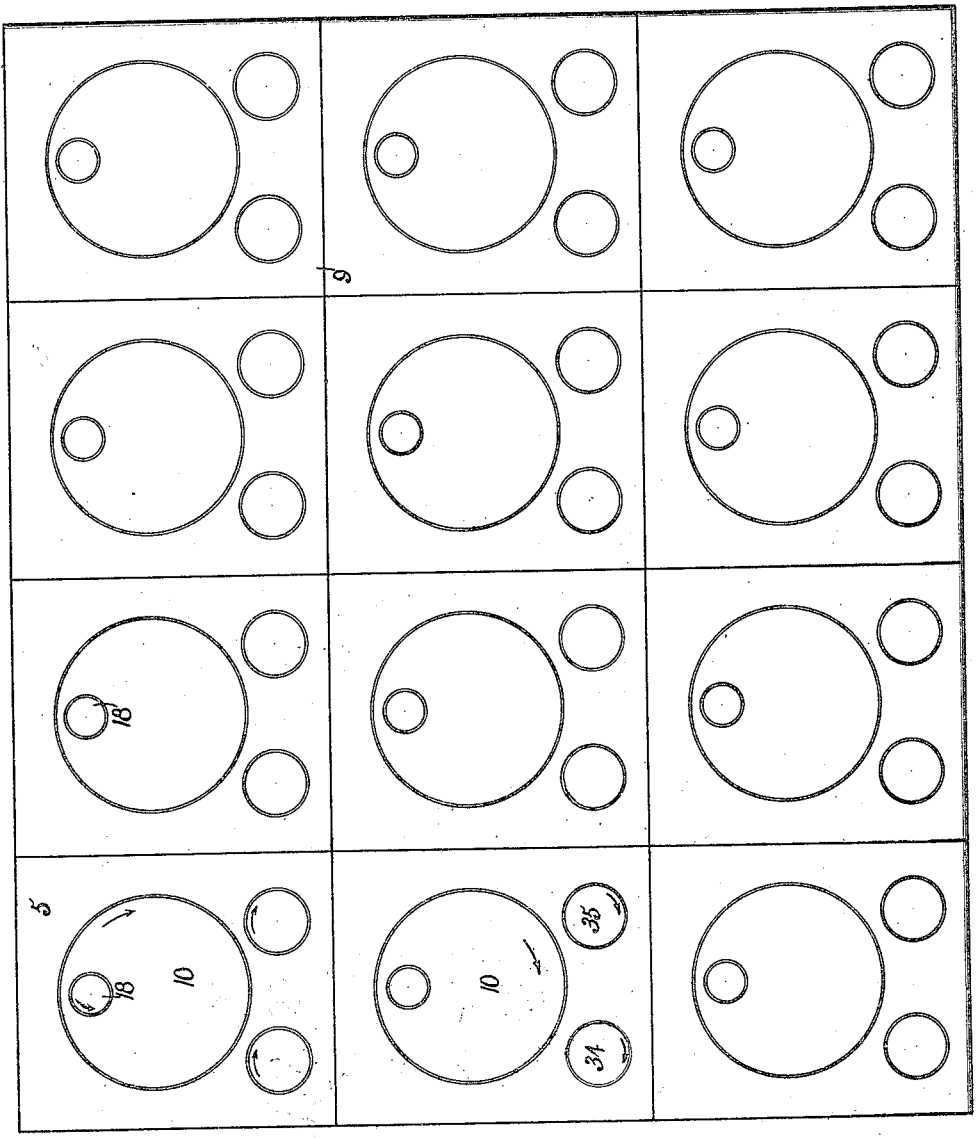
Figure 1 is a plan elevation of a complete stage.

Each of the sections 5 has two rectangular frames 6 disposed horizontally and spaced from each other by stays 7. The lower frame has casters 8 to facilitate the displacement of the sections, and the upper frame 6 is provided with a cover or rectangular platform 9. A main disk 10 is mounted in the platform 9 to have its upper surface flush with that of the upper surface of the platform. The main disk 10 has a shaft 11 constrained to revolve therewith and which bears in braces 12 provided on the frames 6.

Revolubly mounted on the shaft 11 is a gear 13 with which a grooved pulley 14 is constrained to revolve. The gear 13 meshes with a pinion 15 carried in a bracket 16 depending from the disk 10. A shaft 17 is constrained to revolve with the pinion 15 and it bears in the bracket. The shaft 17 carries a disk 18 within the disk 10 which has its upper surface flush with the upper surface of the disk 10, the disk 18 being constrained to revolve with the shaft 17.

Motion is imparted to the grooved pulley 14 by an endless belt 19 from a grooved pulley 20 on a shaft 22 which bears in braces 23 of the frames 6. Motion is imparted to the grooved pulley 21 by an endless chain 24 engaging a grooved pulley 25 which is constrained to revolve with a grooved pulley 26 and with a shaft 27 bearing in the braces 23 of the frame 6. The grooved pulley 26 is connected by an endless belt 28 to a grooved pulley 29 constrained to revolve with the shaft 11.

Motion is imparted to the shaft 27 by a grooved pulley 30 which is connected by an endless belt 31 to a grooved pulley 32 which is driven from a motor 33 through a bevel gear and pinion. The shafts 22 and 27 carry disks 34 and 35 respectively within the platform 9 which are constrained to revolve with the shafts and which have their upper surfaces flush with the upper surface of the platform.

The motion imparted to the shaft 27 by the motor 33 is transmitted to the shafts 11 and 22. If the belts are not crossed, then the disks 10, 34 and 35 will revolve in the same direction, but by crossing some of the belts they may revolve in opposite directions. The gear 13 revolves in the same direction as the disk 10; in consequence the disk 18 revolves in a direction opposite, and the speed of the disk 18 is determined by the speed of the disk 10. The rotation of those disks enters into the performance of the various stunts.

The sections are united or bound together by bolts or similar means so as to form a unit. They are fastened to the floor to prevent displacement at the time of performance. The motors are controlled from a switchboard in the wings of the stage. In place of motors, manual power may be utilized if so desired.

I claim:

1. A stage of the class described comprising,—a plurality of sections each comprising a pair of horizontally disposed frames, stays spacing said frames, a substantially rectangular platform on the upper frame, casters on the lower frame, a large disk revolubly mounted substantially in the central part of the platform and flush with the same, a pair of disks revolubly mounted in the platform, one near each corner, and means for imparting rotary motion to said disks.

2. A stage of the class described comprising,—a plurality of sections each having a platform, a disk revolubly mounted in the central part of the platform to be flush therewith, a pair of disks also revolubly mounted in the platform to be flush therewith, another disk revolubly mounted in the first-mentioned disk and flush therewith, and means for revolving all of said disks.

3. A stage of the class described comprising,—a plurality of sections each having a platform, a large disk revolubly mounted substantially in the central part of the platform and flush therewith, a small disk revolubly mounted in the large disk near the margin of same and flush with said disk, a pair of disks revolubly mounted in the platform, one near each corner, and means for revolving said disks.

4. A stage of the class described comprising,—a plurality of sections each having a platform, a large disk revolubly mounted substantially in the central part of the platform and flush therewith, a small disk revolubly mounted in said large disk near the margin of same and disposed to be flush with said large disk, a pair of disks revolubly mounted in the platform, one near each corner, said disks adapted to be flush with the platform, and means for revolving said disks so that the large disk and the small disk therein are adapted to revolve in opposite directions.

5. A stage of the class described comprising,—a plurality of sections each comprising a pair of horizontally disposed frames, stays spacing said frames, a substantially rectangular platform on the upper frame, casters on the lower frame, a large disk revolubly mounted substantially in the central part of the platform and flush with the same, a small disk revolubly mounted in the large disk and flush with the same, a pair of disks revolubly mounted in the platform, one near each corner, said disks being flush with the platform, grooved pulleys associated with said large and said pair of disks, belts engaging said grooved pulleys whereby said disks may be rotated in the same or in opposite directions, means for actuating said belts, and gears for transmitting motion through the large disk and the small disk.

6. A stage of the class described comprising,—a platform, a disk revolubly mounted in the platform, a second disk revolubly mounted in the first and eccentric with the first, and means for revolving the two disks in opposite directions.

7. A stage of the class described comprising,—a platform, a disk revolubly mounted in the platform, a second disk revolubly mounted in the first and eccentric with the first, and motion-transmission means from the first disk to the second whereby the two disks are revoluble in opposite directions.

8. A stage of the class described comprising a plurality of sections each having a platform, and a pair of disks revolubly mounted in said platform so that one of the disks is in the other and both are flush, the axes of revolution of said disks being eccentric.

THOMAS D. BREEN.

Copies of this patent may be obtained for five cents each, by addressing the "Commissioner of Patents, Washington, D. C."